United States Patent [19]

Buchwald et al.

[11] Patent Number: 4,820,560

[45] Date of Patent: Apr. 11, 1989

[54] CABLE WRAPPING STRIP

[75] Inventors: Holger Buchwald, Hemsbach; Ingrid Schaffert, Hirschberg-Leutershausen, both of Fed. Rep. of Germany

[73] Assignee: Firma Carl Freudenberg, Weinheim, Fed. Rep. of Germany

[21] Appl. No.: 52,280

[22] Filed: May 21, 1987

[30] Foreign Application Priority Data

Nov. 21, 1986 [DE] Fed. Rep. of Germany ....... 3639895

[51] Int. Cl.$^4$ .............................................. B32B 5/16
[52] U.S. Cl. ................................. 428/35.1; 174/23 C; 428/244; 428/283; 428/290; 428/297; 428/323; 428/327; 428/304.4; 428/913
[58] Field of Search ............... 428/283, 323, 281, 280, 428/244, 297, 36, 290, 289, 913, 327, 304.4; 174/23 C

[56] References Cited

U.S. PATENT DOCUMENTS 4,639,390  1/1987  Shoji .................................. 428/288

*Primary Examiner*—James J. Bell
*Attorney, Agent, or Firm*—Felfe & Lynch

[57] ABSTRACT

Disclosed is a swellable nonwoven fabric strip for a cable wrapping having a specific resistance of 3,000 $\Omega \cdot cm^2$ or less and a method for its manufacture. The strip is in the form of a fibrous flat material without perceptible layered construction, wherein the fibers are aligned mainly lengthwise of the strip and are 95 to 75 wt.-% in the form of viscose fibers and 5 to 25 wt.-% in the form of shrunken polyvinylalcohol fibers soluble in water beginning at 80° C. The flat material is uniformly impregnated with a binding agent which under the action of water loses its ability to adhere. The strip contains swelling powder particles which swell upon the access of water but do not dissolve, the swelling agent being distributed in an amount of 20 to 40 g/m$^2$. The strip is capable of swelling at the place of access of the water to at least 90% of its achievable thickness in approximately one minute.

5 Claims, No Drawings

CABLE WRAPPING STRIP

BACKGROUND OF THE INVENTION

The invention relates to a cable wrapping strip of nonwoven fabric whose purpose is to render the space between the jacket and core in an electrical cable waterproof lengthwise. For this purpose the wrapping strip contains particles of a material which swells greatly upon the entry of water but is insoluble in water, and is referred to hereinafter as a "superabsorber." The swelling of such a wrapping when exposed to moisture leads to the sealing off of the space between cable and core, and the shielding wires if any, so that propagation of the water lengthwise of the cable is prevented and the damage remains limited to a short length of the cable.

The swellable powder consists as a rule of a crosslinked sodium salt of a polyacrylic acid.

Without such a swellable wrapping, short circuits develop upon the penetration of moisture into electrical high-voltage cables or communication cables due to often unavoidable damage done to the jacket when they are laid (cutting and kinking). It can happen that paper insulation in multi-conductor cables becomes wet, or entering water propagates between the cable core and jacket and between the conductors themselves. Due to insulation defects, these wires can then become grounded through the water in the area of splices and taps.

To stop this lengthwise propagation of the water it is necessary that it be absorbed as quickly as possible by the wrapping.

In the case of medium- and high-voltage cables, a wrapping strip is also expected to provide, by means of a partially conducting property produced by carbon black, an electrical contact between a partially conducting intermediate layer present in the cable, which is made of carbon-filled polyethylene, and the conductive metallic shielding. The contact must be maintained even upon the expansion or contraction of the cable due to extreme heating or cooling. Such effects are produced in these cables by inductively produced temperature fluctuations of 80° to more than 200° C.

The partially conductive intermediate layer is intended to prevent corona discharges within the cable due to unequal potential distribution on the insulation. In addition to the above-named thermal effects, the brittleness of the partially conductive layer can cause spalling and cracking when the cable is flexed, and this leads to undesirable ionization. In these cases too the wrapping strip is intended to have an electrical bridging effect so as to assure that the intermediate layer has no electrical potential different from that of the metal shielding.

In the production of these cables the wrappings are wound very tightly on the cable either helically or lengthwise. The width of a strip amounts often to 1 to 15 cm, but special other methods of application are conceivable. The thickness can vary from 0.3 to 1 mm, although lesser or greater thicknesses can be used in special cases, e.g., for cables of lower quality with larger interior cavities. Also the application of more than one layer of wrapping has already been practiced. Frequently needed specific weights are between 90 and 200 grams per square meter.

DE-PS No. 1,790,202 discloses a cable wrapping strip in which the superabsorber powder is embedded in an open-pored, water-repellent foam matrix. This embodiment assures a uniform fixing of the absorber particles on the wrapping. However, the time it takes for the powder to swell is disadvantageously lengthened by its being surrounded on all sides by the water-permeable foam. For the same reason any very great increase in the volume of the absorber particles is hampered. Since the penetration of water through the open-pored foam is additionally hampered by surface tension effects, it takes too long overall for the mass to react and swell to block off the area of the water leakage, and during this time the water penetrates unhampered longitudinally within the cable. Another disadvantage is that it is technically very difficult to make such a foam material electrically semiconductive.

Accordingly, swellable wrappings are being marketed in which the superabsorber is placed on a relatively impermeable nonwoven layer which it cannot penetrate and which, in some cases, is impregnated with carbon black. The sandwich of materials is often consolidated with a water-impermeable binding agent.

This construction assures that if the winding is performed in an obligatory direction with the thin nonwoven layer out and damage occurs, the water will immediately reach the swelling powder as required, although only from one side, namely through the nonwoven covering. Therefore the swelling is very slow to start, and the wrapping achieves only a small final volume. The absorbent particles are bound so tightly between the nonwoven layers that first a sufficient swelling pressure is needed, and hence a considerable amount of time, before the fiber bonds of the nonwoven covering are destroyed and additional volumetric swelling of the swelling agent becomes possible. The swelling powder is not at all able to break up the basic nonwoven that is on the other side.

Other disadvantages are the considerable leakage of the superabsorber through the thin covering nonwoven during manufacture and assembly, the prescribed winding direction with the covering nonwoven out, the great danger of damage to the delicate, thin covering fabric, and the interruption of the electrical conductivity in the cross section of the wrapping strip by the layer of swelling powder, i.e., the excessively high specific resistance, which amounts to more than 10,000 ohms per square centimeter. Cable manufacturers are generally expected to provide values of $3,000 \Omega \cdot cm^2$ or less.

The invention is addressed to the problem of devising a swellable cable wrapping strip in which complete swelling is achieved within a shorter interval of time than heretofore upon contact with water, in which the water can enter from both sides (no prescribed winding direction), in which the swelling agent does not leak out, and which can be provided with or without carbon black, and if it is provided with carbon black it must be possible to achieve specific resistances of $3,000 \Omega \cdot cm^2$ or less. The wrapping strip must be able to withstand without damage the high longitudinal traction stresses occurring in the manufacture of cables when they are reeled up. Furthermore, a method is to be found in which the manufacture of the wrapping strips according to the invention can be changed over from carbon-free to carbon-containing products without further measures. Moreover, the method is to indicate how to proceed so that the finished cable wrapping strip no longer will appear to be laminated and thus, when a carbon black-containing binding agent is added, will have the required specific resistance.

SUMMARY OF THE INVENTION

The present invention is in a swellable cable wrapping strip and a process for producing the strip. The swellable cable wrapping strip of the invention overcomes the problems and disadvantages described above.

The strip is in the form of a fibrous flat material without perceptible layered construction, wherein the fibers are aligned mainly lengthwise of the strip and are 95 to 75 wt.-% in the form of viscose fibers and 5 to 25 wt.-% in the form of shrunken polyvinylalcohol fibers soluble in water beginning at 80° C. The flat material is uniformly impregnated with a binding agent which under the action of water loses its ability to adhere. The strip contains swelling powder particles which swell upon the access of water but do not dissolve, the swelling agent being distributed in an amount of 20 to 40 g/m². The strip is capable of swelling at the place of access of water to at least 90% of its achievable thickness in approximately one minute.

The wrapping strip according to the invention has, on the basis of its fiber orientation, the shrunken polyvinyl alcohol fibers, and of the uniformly distributed binding agent, a tensile strength lengthwise of 150 to 200 N/5cm, enabling it to be wound without destruction. The predominant viscose fibers that are present enter into a good union with the binding agent and the polyvinyl alcohol fibers. No appreciable amount of the swelling powder leaks out when the wrapping strip is cut, transported or worked, because the powder is firmly anchored in the structure of the nonwoven fabric bonded by the binding agent and the polyvinyl alcohol fibers.

The wrapping strip shows no recognizable layering in cross section. When the binding agent contains preferably 100 to 300 weight-percent (dry) of uniformly distributed carbon black whose particle size n this case is generally between 0.001 and 0.1 micrometers, the resulting strip has a uniform specific resistance of 3,000$\Omega$·cm² or less as most frequently required by the cable industry.

The most important advantageous property of the wrapping strip of the invention is its ability to immediately and virtually completely swell when water enters the cable. In the uninstalled state, the strip swells within one minute to at least 90% of its achievable thickness. Therefore, when installed in a cable, the strip can quickly render the cable absolutely watertight lengthwise. This property results on the one hand because of the wettability of the predominantly present hydrophilic viscose fibers, which is equal on both sides of the wrapping strip, to the swelling particles.

Particularly important, on the other hand, is the synergistic effect of the polyvinyl alcohol fibers and the binding agent, both of which lose their adhesive properties due to moisture. Under the conditions prevailing in the cable, the fibers do not dissolve in water but do soften while retaining their crimped fiber structure. The entering water therefore immediately destroys the inner strength of the matrix of viscose nonwoven fabric consolidated with binding fibers and binding agent, which fixes the superabsorber. A mass forms of loose viscose fibers, likewise loose polyvinyl alcohol fibers no longer capable of binding, and superabsorber particles, which in the first place further facilitates the access of water to the swelling agent, and offers no substantial resistance to the swelling agent when swelling initiates. The result is an immediate and intense swelling of the wrapping upon the entry of water. The damaged cable is immediately sealed water-tight lengthwise.

It has been found that a freely suspended strip of the wrapping according to the invention, when exposed to water, retains its geometrical shape (column of square cross section) in spite of the great and immediate swelling, and remains self-supporting without any escape of the swelling powder gel from the now loose fiber matrix. The matrix is still sufficiently held together by the crimping of the viscose and polyvinyl alcohol fibers.

Advantageously, the binding agent consists of easily water-soluble polyvinyl alcohol, which results in especially good adhesion to the viscose fibers and to the sparingly soluble polyvinyl alcohol fibers.

Crimped fibers with a titer of approximately 1.7 dtex and a length of approximately 38 mm have proven to be especially suitable for achieving good longitudinal strength.

The swellable particles have grain sizes of 100 to 500 micrometers, in order to prevent dusting to fine particles, and also to prevent excessively coarse particles from causing an irregular distribution of the superabsorber. Applications of 20 to 40 grams per square meter of the swellable particles have been found advantageous.

The swellable cable wrapping can be manufactured by a process of the invention. A cable wrapping strip of the invention is manufactured by coating a first nonwoven fabric with 20 to 40 g/m² of a non-water-soluble swelling agent. In the preferred embodiment, the first non-woven fabric has a specific weight of at least 20 g/m² and is composed of 95 to 75 wt.-% of viscose fibers and 5 to 25 wt.-% of polyvinyl alcohol fibers which are soluble in water beginning at 80° C. The coated fabric is covered with a second nonwoven fabric built up in the same manner as the first non-woven fabric and having the same properties. The covered fabric is treated uniformly from both sides with a foamed 3 to 20% aqueous binding agent which loses its effect in water, in which an amount of binding agent determined in preliminary experiments is applied. The swelling agent still is not activated by the water. The covered fabric is subjected to hot air at a temperature of 130° to 160° C. The first and second fabrics are then merged with one another in cross section by shrinkage and solidified into a unit.

The nonwoven fabrics used should have a specific weight of at least 20 grams per square meter, since otherwise the leakage of fine superabsorber particles can no longer be excluded, even when preferred particle sizes of 100 to 500 micrometers are used. Within the given parameters, the use of 20 to 40 grams of swellable powder per square meter suffices in every case.

The binding agent is formed beating air into it.

The necessary amount of binding agent must be determined by preliminary experiments, by measuring the maximum point at which bilateral impregnation of the nonwovens still does not cause the superabsorber particles to swell.

These preliminary experiments, however, do not require any appreciable time and effort. The volumetric density of the binding agent is reduced by the foaming to $\frac{1}{3}$ to $\frac{1}{4}$ of the original density. Dosing is performed through the width of the gap of 0.4 to 0.9 mm between two rollers where the sandwich is carried through in the impregnating device. This gap also provides for the complete penetration of the nonwoven fabrics with the binding agent.

The advantage of the process according to the invention is that, without interruption of current production, it is possible with little waste to shift quickly from the production of a carbon black-free wrapping strip to a carbon black-containing wrapping, simply by putting in the variant binding agent containing carbon black, foaming it and applying it in the same manner.

During the drying phase, the polyvinyl alcohol fibers soften on their surfaces beginning at about 50° C., shrink, and thereby intimately bind together the nonwoven layers above 110° C. so that boundaries between layers can no longer be distinguished in the cross section of the finished products.

Thus there is no separation of the nonwoven layers by binding agent migration in the finished product. The superabsorber particles are also present in the entire cross section of the wrapping strip. There is not present a definite middle layer of the superabsorber particles increasing the specific resistance.

To obtain a combination of material thickness, longitudinal strength, and the ability to hold the swelling powder, it has been found advantageous to use fibers which have a titer of approximately 1.7 dtex and a length of approximately 38 mm.

One can control the material thickness by controlling the amount of the polyvinyl alcohol fibers within limits of 5 to 25 wt.-%, so that either very bulky or very thin wrapping strips can be made simply in the same manner.

If necessary, the finished wrapping strip can be calandered under pressure in order to achieve further reduction of thickness.

EXAMPLE 1

A nonwoven fabric of 35 g/m$^2$ composed of 90 wt.-% of viscose fibers and 10 wt.-% of polyvinyl alcohol fibers soluble in water above 80° C. is sprinkled on one side with 30 g/m$^2$ of a superabsorber composed of a crosslinked sodium salt of polyacrylic acid. This coating is covered with a nonwoven fabric of the same composition and weight as the support fabric. All fibers have a titer of 1.7 dtex and a length of 38 mm. The absorber has grain sizes around 350 micrometers.

The sandwich is uniformly treated with a 5% aqueous polyvinyl alcohol binding agent solution foamed by whipping in air. It has previously been determined by experiment that an amount of up to 400 g/m$^2$ of the solution still does not activate the superabsorber. The binding agent solution is reduced to $\frac{1}{3}$ of its original volumetric density by the incorporated air. The roll gap is 0.6 mm in dimension. The absorption achieved by the impregnation runs around 400% of the dry weight of the complete sandwich.

After passing through the impregnating mechanism, the material is dried with hot air at 150° C. and is thus consolidated. The polyvinyl alcohol fibers are softened on their surfaces and shrink, and the water escapes from the binding agent solution. The shrinking of the polyvinyl alcohol fibers causes the fabric to shrink to a unit in the cross-sectional direction. Cooling results in a wrapping strip which does not appear to be laminated and has a longitudinal tensile strength of 180 N/5 cm. Also, the swelling powder does not sprinkle out when the wrapping strip is flexed.

To test the swelling ability a weight is placed on a horizontally disposed test strip to apply a pressure of 2.5 g/cm$^2$ and an excess of distilled water is applied at a predetermined point. The time and the amount by which the weight is raised during the swelling are measured. More than 90% of the entire swelling is achieved one minute later. The fiber strand is no longer sticky, yet continues to be self-supporting as a result of the mechanical binding of the crimped fibers extending over the entire cross section of the wrapping strip. The swelling powder now in gel form does not exude in appreciable amounts from the wet fiber strand.

EXAMPLE 2

Under otherwise the same manufacturing parameters, and using the same materials as in Example 1, a binding agent foam having polyvinyl alcohol and carbon black mixed in a dry-weight ratio of 1:1 is employed. Otherwise the procedure is the same as in Example 1.

The specific resistance of the finished wrapping strip amounts to 2,200Ω·cm$^2$, and the surface resistance in each case to 500Ω.

It will be understood that the specification and examples are illustrative but not limitative of the present invention and that other embodiments within the spirit and scope of the invention will suggest themselves to those skilled in the art.

We claim:

1. A cable wrapping strip capable of swelling comprising: a strip in the form of a fibrous flat material without perceptible layered construction, wherein the fibers are aligned mainly lengthwise of the strip and are 95 to 75 wt.-% in the form of viscose fibers and 5 to 25 wt.-% in the form of shrunken polyvinylalcohol fibers soluble in water beginning at 80° C., said flat material being uniformly impregnated with a binding agent which under the action of water loses its ability to adhere, the strip containing swelling powder particles which swell upon the access of water but do not dissolve, the swelling agent being distributed in an amount of 20 to 40 g/m$^2$, the strip being capable of swelling at the place of access of the water to at least 90% of its achievable thickness in approximately one minute.

2. The cable wrapping strip of claim 1 wherein the binding agent is uniformly filled with carbon black in such an amount that the strip has a specific resistance of $\leq 3000\Omega\cdot cm^2$.

3. The cable wrapping strip of claim 1 wherein the binding agent consists of easily water-soluble polyvinyl alcohol.

4. The cable wrapping strip of claim 1 wherein the fibers have a titer of approximately 1.7 dtex and a length of approximately 38 mm.

5. The cable wrapping strip of claim 1 wherein the swellable particles have a grain size of from 100 to 500 microns.

* * * * *